April 3, 1962  R. C. LUND ETAL  3,028,203
SEAL FOR TAPERED ROLLER BEARINGS AND THE LIKE
Filed July 27, 1959  2 Sheets-Sheet 2

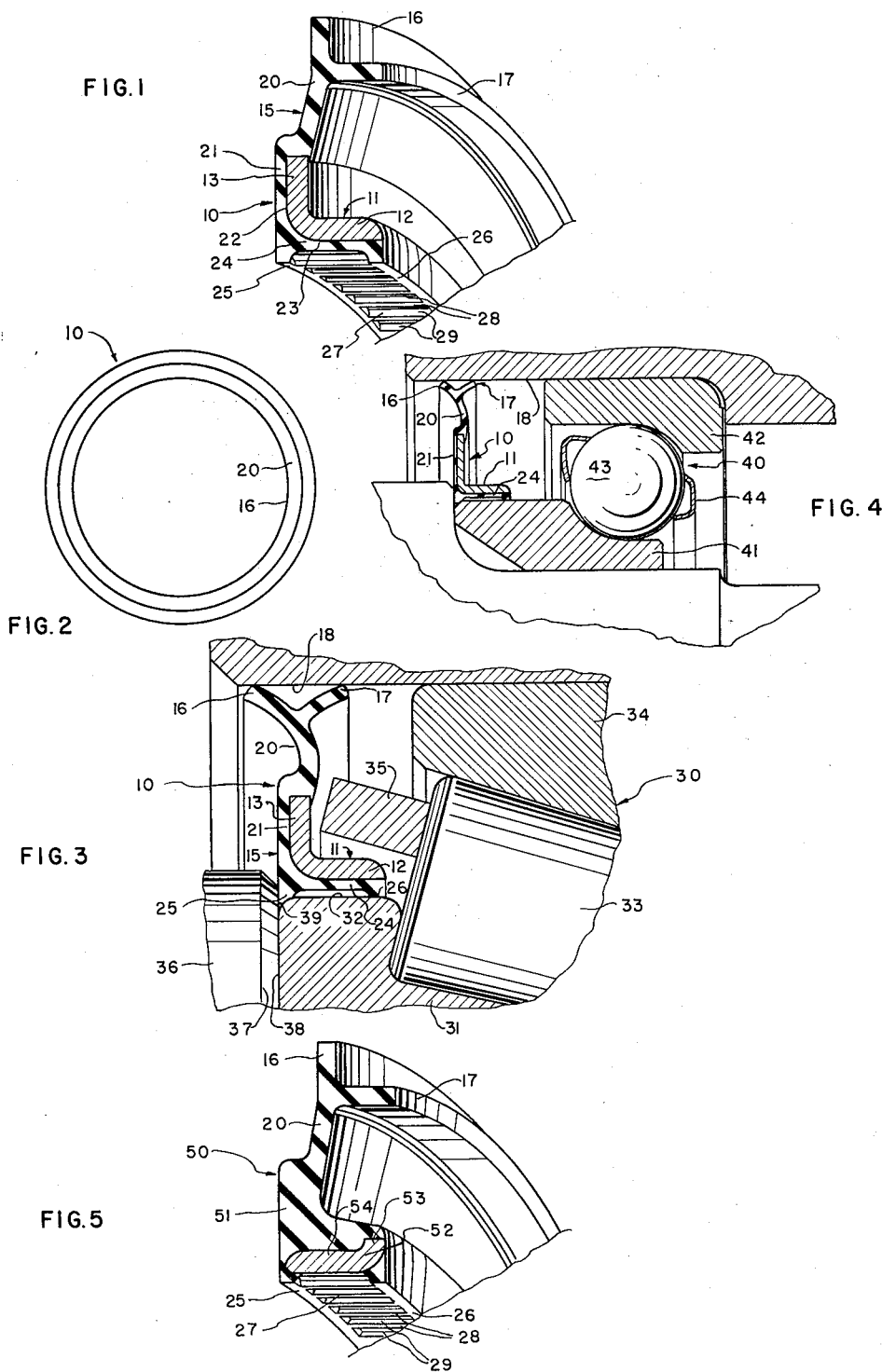

United States Patent Office 3,028,203
Patented Apr. 3, 1962

3,028,203
SEAL FOR TAPERED ROLLER BEARINGS AND THE LIKE
Richard C. Lund, Redwood City, and Edward K. Bowen, Los Altos, Calif., assignors to Federal-Mogul-Bower Bearings, Inc., Detroit, Mich., a corporation of Michigan
Filed July 27, 1959, Ser. No. 829,896
2 Claims. (Cl. 308—187.1)

This invention relates to an improved fluid seal. More particularly, it relates to a lubricant-sealing and dirt-excluding device for use with tapered roller bearings, angular-contact ball bearings, and the like.

The seal of this invention is used particularly as a bearing seal where space is a problem. For example, in automobile front wheels it is desirable to have the central plane of the wheel as close as possible to the plane about which the wheels turn on the king pins, because among other considerations in new automobile designs, the closer these planes are to each other, the less force it takes to turn the wheel. Seals that have to be mounted beside the bearing increase the distance between these planes by at least their own width. The present invention provides a seal that can be mounted on the anti-friction bearing usually within the width of the bearing. Thus the bearing and the seal take up no more space than the bearing alone, whereas, heretofore extra space had to be provided for the lubricant seal.

The seal may also be used with individually sprung and driven front or rear wheels in automotive vehicles and in various types of trailers. In fact, it can be used wherever a tapered roller bearing, an angular-mounted ball bearing, or other such bearing is used. It may also, if desired, be used elsewhere.

The seal of this invention can be installed flush with the end of the bearing cone. As a result it overcomes a problem that confronted prior-art bearing seals. Whenever a portion of such seals lay in between the bearing cone and the spindle or axle, the bearing-thrust load was at least partially transferred from the cone to the spindle through the seal. During operation this usually resulted in a hammering of the seal by the spindle, with an impact on each load change. The hammering rapidly deformed and chewed away the seal material, damaging it and throwing the bearing out of adjustment. With the flush location of the seal made possible by this invention, that problem has been eliminated.

At the same time, it is important for the seal to include means that resist its axial movement, for that could force it against the roll separator or cage of the bearing and prevent true anti-friction movement of the tapered rollers or ball. The present invention has solved this problem by providing a seal structure that, when installed, resists such axial movement toward the tapered rollers.

In order to save needless expense, the present invention provides a seal that can be installed on a roughly-machined, unground shoulder of the bearing cone or inner race. Such surfaces are normally machined to a relatively large tolerance; e.g., ±0.003", without further treatment other than hardening. The seal must fit neither too loosely nor too tightly. A typical seal with a smooth cylindrical inner periphery is not satisfactory, for it cannot accommodate the range of tolerances, for the elastomeric inner periphery has to flow axially when it engages the shaft. Moreover, seals of the prior art, which did have a smooth cylindrical inner periphery, had a tendency to spring back axially after being pushed into place by an installation tool, with the result that they were difficult to locate precisely. The present invention solves these problems by providing a novel seal having a pair of inner peripheral rims joined axially by a knurled inner periphery. The great significance of this structure is not at once obvious, but it will become clear in the course of the description.

The invention makes it possible to install the seal by hand; yet, when installed it resists both axial over-installation and rotational movement, and it will not leak.

Another problem solved by this invention is that of protecting the metal reinforcing members from corrosion by preventing their exposure to the atmosphere.

In general, the seal of this invention comprises an annular metal reinforcing member to which is bonded a special type of elastomeric member. Its inner periphery, as already mentioned, comprises a knurled portion—i.e., a series of axial ribs and depressions—lying between end rims. Its outer periphery is preferably provided with a dual-lip structure in which the lips preferably extend at right angles to each other. It is installed over a cone shoulder or the like and its lips bear against a housing bore. This is only a brief description of the highlights. Further description is given below, and other objects and advantages of the invention will appear in the course of this description.

In the drawings:

FIG. 1 is a fragmentary view in perspective and in section of a seal embodying the principles of the present invention.

FIG. 2 is a view in end elevation of a complete seal like that of FIG. 1 shown on a reduced scale.

FIG. 3 is a fragmentary view in side elevation and in section of the seal of FIG. 1 installed in a tapered roller-bearing assembly.

FIG. 4 is a view like FIG. 3, but on a reduced scale, of the seal of FIG. 1 installed in an angular-contact ball-bearing assembly.

FIG. 5 is a view like FIG. 1 of a modified form of seal of the invention.

Figure 6:
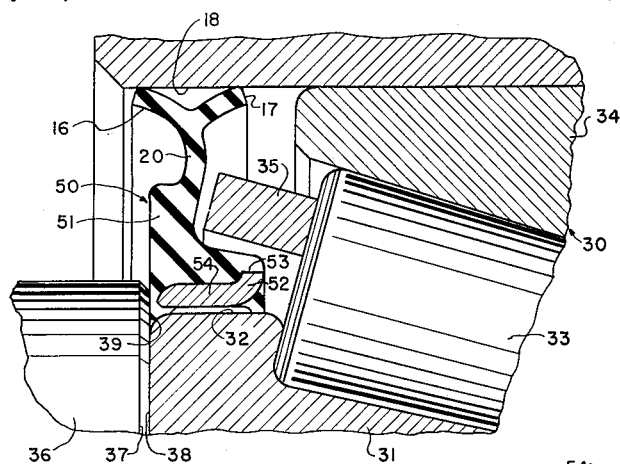
FIG. 6 is a view like FIG. 3 showing the seal of FIG. 5 installed in place.

FIG. 1 shows a seal 10 comprising a rigid metal washer 11, which is L-shaped in cross-section, having a cylindrical or axially extending portion 12 and a radial flange 13. Bonded to this washer 11 is an oil-resistant synthetic rubber sealing member 15 having two sealing lips 16 and 17. As in patent application Serial No. 672,943 filed July 19, 1957 by Ralph W. Zimmerman, these sealing lips 16 and 17 are molded in a position different from that which they occupy when installed. After installation, both the lips 16 and 17 are in contact with a cylindrical bore 18 (see FIG. 3) but, when molded, the lip 16 extends on the radial plane and the lip 17 extends axially, approximately at a right angle to the lip 16. Thus, the lips 16 and 17 form an ell in cross-section. The lips 16 and 17 are connected by a flexible web 20 to a radially inner body portion 21 of the seal 10.

It will be noted that the outer face 22 of the radial flange 13 is covered completely by the rubber body 21, which is integral with the lips 16, 17. The inner periphery 23 of the axial flange 12 is also covered by an axially extending portion 24 of the body 21. This means that the metal reinforcement 11 is completely protected from corrosion, since the only uncoated metal surfaces are those that are not exposed to the atmosphere but instead are protected by the lubricant.

The synthetic rubber axial portion 24 is a very important part of this invention. It will be noted that it comprises an axially outer rim 25 and an axially inner rim 26, and that the rims are connected by a knurled portion 27, comprising axially extending ribs 28 and recesses 29. The ridges or rims 25 and 26 serve to prevent leakage around the inner periphery 25 and serves to prevent over-installation of the seal. The knurl 27 provides rubber press-fit interference for holding the seal in place and also serves to connect the two rims 25 and 26 so that they may be molded simultaneously.

An exceptional and unique feature of the rubber knurl 27 is that during press-fitting the rubber ribs 28 are deformed laterally with respect to the knurl; i.e., peripherally, and this local rubber movement tends to fill, but does not completely fill, the recesses 29 with rubber. This contrasts with the prior art, where axial rubber movement occurred under high stress, this being inherent in a seal with a solid or smooth inner periphery. The stresses involved in local movement of knurled rubber are much less for a given amount of diametral interference that those resulting from axial movement of a solid inner periphery. It follows that a much larger interference, and also variations in interference, are possible with this knurled-rubber inner periphery. In fact, a hand-pressed fit is tolerated, since the knurl lies approximately at right angles to the direction of rotation, and the ribs 28 tend to grip the shaft and prevent movement relative to the shaft. The amount of axial spring-back of the seal is also less, due to the predominantly lateral (rather than axial) rubber displacement. Therefore, when the seal 10 is installed flush with a bearing cone, it will stay flush, whereas smooth inner-periphery seals will not.

It is preferable that the two bands or rims 25 and 26 be similar, and that the knurl be provided by recesses 29 which are chamfered or provided with a radius, to prevent the tearing or damage that can result during removal from the mold when there are sharp edges.

A typical installation is shown in FIG. 3. Here there is a tapered roller-bearing 30 having a cone 31 with a shoulder 32 providing the cylindrical surface on which the inner peripheral portion 24 fits. A series of tapered rollers 33 are located between the cone 31 and a cup 34, and a roll-separator 35 is provided. A spindle or shaft 36 has a beveled end 37 that abuts against the seal 10, which is flush with the end wall 38 of the cone 31. During installation, the web 20 is flexed, and the lips 16 and 17 are deflected so that both of them are in contact with the bore 18, in which the cup 34 fits. The lip 16 excludes dirt, dust, and other foreign matter to protect the bearing 30, and the lip 17 prevents escape of lubricant from the bearing. The flush installation of the seal 10 obviously takes up no more room than the bearing 30 above.

It will be noted that the shoulder 32 has a radius 39, leaving space where the outer rim 25 retains part of its original shape and dimensions. This enables it to resist further axial movement and prevents over-installation from occurring accidentally when the bearing 30 is installed or during prior handling, for the installation of the bearing 30 is usually done blind. On automobiles, the brake drum and other parts prevent one from observing the seal 10 at the time the seal and its part of the bearing are assembled with the bore containing the bearing cup.

As FIG. 4 shows, the seal 10 can be installed as well in an angular contact ball bearing 40. The bearing 40 has a radially inner and axially outer race 41 and a radially outer and axially inner race 42, balls 43, and a cage 44. The seal 10 is installed as before.

The seal 10 is capable of replacement use, whether the bearing had a seal before or not, since the seal 10 fits within the bearing. It is especially useful when the shaft 36 has been pitted and scored or otherwise made unsuitable to seal upon.

FIGS. 5 and 6 show a seal 50 generally like the seal 10, so far as the lips 16, 17 are concerned, but differs in that the web 20 leads to a thickened rubber body 51. A metal member 52 instead of being of a definite L-shape has only a short radial portion 53, which may be at either end of an axial portion 54. Again, the metal member 52 is completely protected from corrosion. In addition, the knurl 27 is used to locate the metal member 52 in the rubber mold, so that (except for the recesses 29) it is completely coated with rubber. The installation of the seal 50 is like that of the seal 10, with very similar results.

Figure 7:
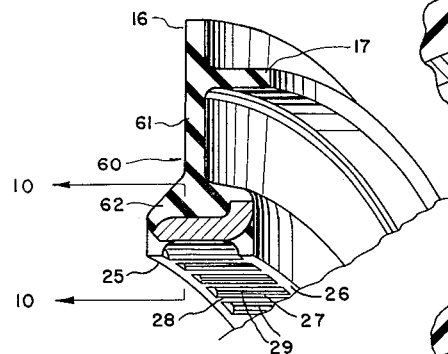
FIG. 7 is a view like FIG. 1 of another modified form of seal of the invention.
Figure 8:
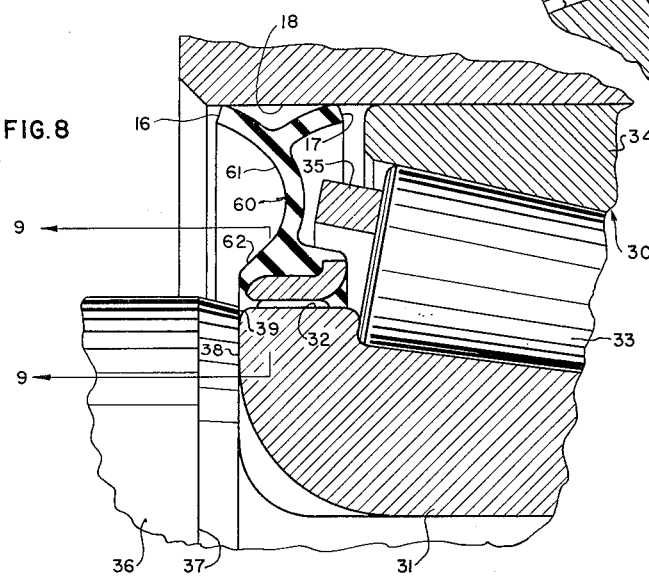
FIG. 8 is a view like FIG. 3 showing an installation of the seal of FIG. 7.

The seal 60 of FIGS. 7 and 8 is substantially like the seal 50; a web 61 which is truly radial is provided instead of the inclined web 20. Also, a body 62 is shown as some shorter, but this is more a matter of choice; the main difference here being the straight web 61. The functions are not greatly different, except that such a web 61 does not permit quite as narrow an installation, so that this seal will extend somewhat further outwardly, when installed, as shown in FIG. 8. This may be done on certain occasions when it is desirable to reduce the lip pressure or the seal torque.

Figure 10:
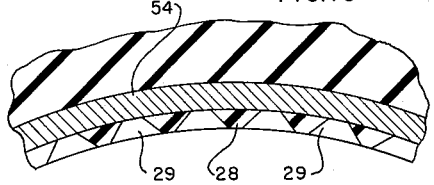
FIG. 10 is a view like FIG. 9 of the same portion of the seal before its installation, taken along the line 10—10 in FIG. 7.
Figure 9:
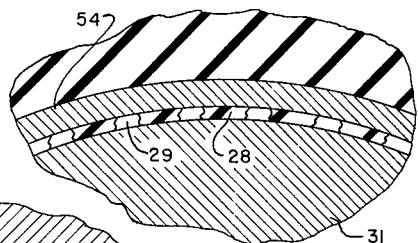
FIG. 9 is a fragmentary enlarged view taken along the line 9—9 in FIG. 8, showing how the rubber fills the recesses when on the shaft.

FIGS. 9 and 10 show how the rubber flows into the recesses 29 when put on the bearing shoulder 32.

A feature of the invention is a method for the determination of the depth of the knurl 27. The shaft and bore tolerances are known, as well as the manufacturing tolerances on the seal, and these are the only variables. Therefore, the knurl depth, the knurl press-fit, and the knurl inner diameter and outer diameter can be determined. Thus, for example, assuming a shaft having a tolerance of plus or minus .003", there is an allowance of .006". Assuming a seal-manufacturing tolerance of plus or minus .002", or an allowance of .004", the sum of the two allowances would be .010", and when divided by 2 this value is .005". This design constant will be termed K.

Once K is determined, the depth of the knurl recesses 29 should be 4K. Thus, with a seal when K is .005", 4K is .020".

Figure 11:
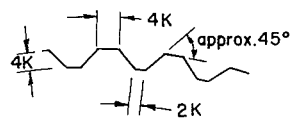
FIG. 11 is a fragmentary diagram illustrating the calculation of proper proportions.

When the depth of the knurl has been determined, the knurl interference will be 1½K per side or 3K across the diameter. Where unusual tolerances are encountered, adjustments may be made. The axial width of the two bands at each end of the knurl are determined from a scale drawing, like that of FIG. 11, using a figure less than the metal thickness as a starting point. The peripheral width of the rib 28 should be 2K and that of the recess 29 preferably about 4K so that the rib rubber has ample space to move laterally.

To those skilled in the art to which this invention relates, many additional changes in construction and widely differing embodiments of the invention will suggest themselves without departing from the spirit and scope of the invention as defined in the claims.

What is claimed is:

1. A tapered roller bearing assembly for installation into a smooth cylindrical housing bore, including in combination a cone having a smooth cylindrical shoulder, a cup, a cage, tapered rollers held by said cage between said cone and said cup, and a fluid seal for press-fit installation on said shoulder, said bearing shoulder having an axially outer end wall and a radius portion connecting said end wall to said cylindrical shoulder, said seal comprising a continuous metal ring having a cylindrical portion and a continuous elastomeric annular sealing element molded to the ring and having sealing lip means lying radially beyond said ring for contact with said cylindrical housing bore and an inner peripheral portion lying radially within and closely supported by said cylindrical portion, for contact with said shoulder, said peripheral portion comprising two identical parallel annular rims at axial extremities joined by axial ribs, said ribs and rims bounding a plurality of axially extending recesses, said rims providing, when said seal is installed, an inner rim closer to the rollers and serving to prevent fluid leakage, and an outer rim farther from the rollers for resisting axial displacement toward the rollers, while said ribs prevent rotary displacement of the installed seal, said recesses providing space for flow of elastomer from said ribs and rims, so that a relatively wide range of tolerances in the sizes of said cylindrical bore wall and said shoulder can be accommodated while still obtaining a leak-tight, displacement-resisting fit, said seal being flush with said end wall, one said rim overlying said radius portion.

2. A bearing assembly for installation into a smooth cylindrical housing bore, including in combination an inner member having a smooth cylindrical shoulder, an outer member, a cage, a series of rotatable bearing elements held by said cage between said inner and outer members, and a fluid seal for press-fit installation on said shoulder, said shoulder having an axially outer end wall and a radius portion connecting said end wall to said cylindrical shoulder, said seal comprising a continuous metal ring having a cylindrical portion and a continuous elastomeric annular sealing element molded to the ring and having sealing lip means lying radially beyond said ring for contact with said cylindrical housing bore and an inner peripheral portion lying radially within and closely supported by said cylindrical portion, for contact with said shoulder, said peripheral portion comprising two identical parallel annular rims at axial extremities joined by axial ribs, said ribs and rims bounding a plurality of axially extending recesses, said rims providing, when said seal is installed, an inner rim closer to the bearing elements and serving to prevent fluid leakage, and an outer rim farther from the bearing elements for resisting axial displacement of the installed seal, said recesses providing space for flow of elastomer from said ribs and rims so that a relatively wide range of tolerances in the sizes of said cylindrical bore wall and said shoulder can be accommodated while still obtaining a leak-tight, displacement-resisting fit, said seal being flush with said end wall, one said rim overlying said radius portion.

References Cited in the file of this patent

UNITED STATES PATENTS

| | | |
|---|---|---|
| 2,173,250 | Fay | Sept. 19, 1939 |
| 2,322,867 | Meyer | June 24, 1943 |
| 2,616,736 | Smith | Nov. 4, 1952 |
| 2,878,084 | Bermingham | Mar. 17, 1959 |

FOREIGN PATENTS

| | | |
|---|---|---|
| 826,877 | Germany | Nov. 19, 1953 |
| 1,139,430 | France | Feb. 11, 1957 |
| 1,177,863 | France | Dec. 8, 1958 |